(12) United States Patent
Kinley

(10) Patent No.: US 8,277,156 B2
(45) Date of Patent: Oct. 2, 2012

(54) COVER FOR SECURING A LOAD IN AN ENVIRONMENT AND RELATED METHODS

(75) Inventor: Daniel Kinley, Gig Harbor, WA (US)

(73) Assignee: Load Control Systems Inc., Tacoma, WA (US)

( * ) Notice: Subject to any disclaimer, the term of this patent is extended or adjusted under 35 U.S.C. 154(b) by 71 days.

(21) Appl. No.: 12/660,703

(22) Filed: Mar. 2, 2010

(65) Prior Publication Data

US 2010/0219657 A1    Sep. 2, 2010

Related U.S. Application Data

(60) Provisional application No. 61/208,932, filed on Mar. 2, 2009.

(51) Int. Cl.
*B60P 7/08* (2006.01)

(52) U.S. Cl. .......................................... 410/97; 410/118

(58) Field of Classification Search .................... 410/34, 410/96, 97, 98, 100, 117, 118; 24/300, 301, 24/302; 150/154, 166; 296/100.15, 100.16, 296/100.01, 136.1; 248/499
See application file for complete search history.

(56) References Cited

U.S. PATENT DOCUMENTS 5,050,924 A * 9/1991 Hansen
8,025,468 B2 * 9/2011 Sever .............................. 410/47

* cited by examiner

*Primary Examiner* — Stephen Gordon
(74) *Attorney, Agent, or Firm* — Janeway Patent Law PLLC

(57) ABSTRACT

A cover for securing a load in an environment includes a sheet; a strap having a length that is extendable, and that includes a first end portion, a middle portion, and a second end portion; a first coupler attached to the strap's first end portion and operable to releasably attach the strap's first end portion to a structure other than the sheet to anchor the cover; a second coupler attached to the strap's second end portion and operable to releasably attach the strap's second end portion to a structure other than the sheet to anchor the cover; and a fastener operable to fasten the strap's first end portion to the sheet. When the sheet is used to secure and/or cover a load the first coupler is disposed between the fastener and the strap's middle portion. By having the first coupler located between the fastener and the strap's middle portion, one can both secure the load with the strap and secure the cover 10 to the structure. Thus, one can quickly, easily and adequately secure and cover a load with the cover.

14 Claims, 2 Drawing Sheets

COVER FOR SECURING A LOAD IN AN ENVIRONMENT AND RELATED METHODS

CROSS REFERENCE TO RELATED APPLICATION AND CLAIM OF PRIORITY

This application claims priority from commonly owned U.S. Provisional Patent Application 61/208,932, filed 2 Mar. 2009, and titled "Load Securing System for Small Trucks and Trailers", presently pending, which is incorporated by reference.

BACKGROUND

Trucks are among the most popular vehicles in the United States, and are frequently used to carry a variety of loads either commercially or for personal reasons from one location to another. For example, pickup trucks are frequently used to carry unwanted materials to a dump or recycling center; and/or wanted items such as a TV, a wardrobe and construction materials to a new house or apartment, or sporting equipment such as football gear, soccer gear, camping gear, fishing gear, and hunting gear. To carry the load, the pickup truck can either carry the load in the truck's bed or in a trailer towed behind the truck.

When using a pickup truck to transport a load, one typically should secure the load within the truck's bed or towed trailer to prevent the load from inadvertently escaping from the bed or trailer. One also typically covers the load to help keep the load dry and clean during transportation, and to prevent small objects from inadvertently escaping the truck and/or towed trailer. To adequately secure and cover a load one typically has to tie down all or portions of the load with a rope or elastic that is fastened to the wall of the truck's bed or wall of the towed trailer. This can be time consuming because one often has to first untangle the ropes and/or elastics, then figure out where to place each rope and/or elastic relative to the load to adequately secure the load, then tie each end of each rope and/or elastic to the truck. After the load is secured, one can put a cover over the load by untangling more ropes or elastics and tying each of their respective ends to the truck too.

Unfortunately, because adequately securing and covering a load is time consuming, many people secure and cover their loads inadequately. This often results in small and/or large objects falling or blowing off vehicles and slamming into windshields of trailing vehicles, and/or lying in the middle of the road. This, in turn, frequently causes the driver of a trailing vehicle to swerve erratically and dangerously to avoid the objects, and thus, can frequently cause the driver to lose control of his/her vehicle.

SUMMARY

In one aspect of the invention, a cover for securing a load in an environment includes a sheet operable to cover the load to protect the load from the environment and to retain the load; a strap having a length that is extendable, and that includes a first end portion having a length, a middle portion having a length, and a second end portion having a length, the first and second end portions each having an end that is distal to the middle portion; a first coupler attached to the strap's first end portion and operable to releasably attach the strap's first end portion to a structure other than the sheet to anchor the cover; a second coupler attached to the strap's second end portion and operable to releasably attach the strap's second end portion to a structure other than the sheet to anchor the cover; and a fastener operable to fasten the strap's first end portion to the sheet. Furthermore, the location of the first coupler relative to the fastener and the strap's middle portion is such that when the sheet covers a load and the first and second couplers are attached to a structure to anchor the cover, the first coupler is disposed between the fastener and the strap's middle portion as one travels the length of the first end portion from the first end portion's end toward the strap's middle portion.

By having the first coupler located between the fastener and the strap's middle portion, one can both secure the load with the strap, and secure the cover to the structure by exerting pressure on the strap, such as pulling the strap tight, to generate tension in the strap. To keep tension in the strap after one lets go of the strap, one fastens the strap to the fastener. With tension in the strap and because the strap's length is extendable, the strap holds the load in place; and, if the load does move or shift, the strap holds the load in the new position. Thus, one can quickly, easily and adequately secure and cover a load.

DETAILED DESCRIPTION

Figure 1:
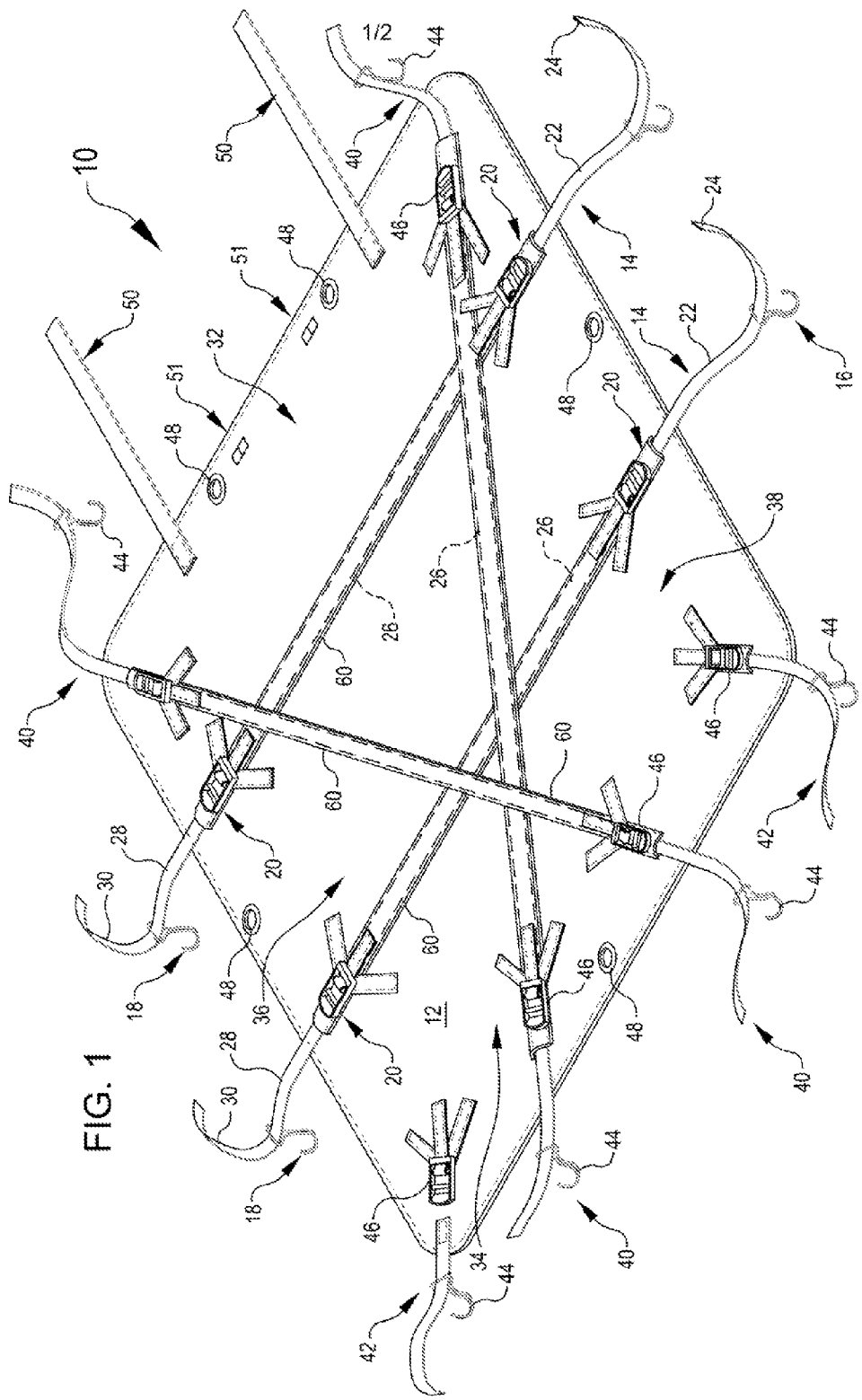
FIG. 1 is a perspective view of a cover according to an embodiment of the invention.

FIG. 1 is a perspective view of a cover 10 according to an embodiment of the invention. The cover 10 may be used to secure and wholly or partially cover a load (not shown) carried in a pickup truck's bed, a trailer's bed, or stored on the ground waiting to be picked up, or moved. The cover 10 includes a sheet 12, and a strap 14 having a length that is extendable (two in this embodiment of the cover). The cover 10 also includes a first coupler 16 (two in this embodiment of the cover), a second coupler 18 (two in this embodiment of the cover), and a fastener 20 (four in this embodiment of the cover). The sheet 12 is operable to cover a load to protect the load from the environment and to retain the load. The strap 14 (discussed in greater detail in conjunction with FIG. 2) includes a first end portion 22 having a length and an end 24, a middle portion 26 having a length, and a second end portion 28 having a length and an end 30. The first coupler 16 releasably attaches the strap's first end portion 22 to a structure (not shown) other than the sheet 12, such as the wall of a truck's bed, the wall of a building, or the ground, to anchor the cover 10. Similarly, the second coupler 18 releasably attaches the strap's second end portion 28 to a structure other than the sheet 12 to anchor the cover 10. Two of the four fasteners 20 fasten their respective strap's first end portion 22 to the sheet 12 (here, the strap's first end portion 22 is shown unfastened, but in FIG. 2 one of the strap's first end portion 22 is shown fastened to the sheet 12). The other two fasteners 20 fasten their respective strap's second end portion 28 to the sheet 12.

When the sheet 12 covers a load and the first and second couplers 16 and 18, respectively, are each attached to a structure to anchor the cover 10, the first coupler 16 is disposed between the fastener 20 and the strap's middle portion 26 (see FIG. 2) as one travels the length of the first end portion 22 from the first end portion's end 24 toward the strap's middle portion 26. By having the first coupler 16 located between the fastener 20 and the strap's middle portion 26, one can both secure the load with the strap 14, and secure the cover 10 to the structure by exerting pressure on the strap 14, such as pulling the strap 14 tight, to generate tension in the strap 14. To keep tension in the strap 14 after one lets go of the strap 14, one fastens the strap 14 to the fastener 20. With tension in the strap 14 and because the strap's length is extendable, the strap 14 holds the load in place, and, if the load does move or shift, the strap 14 holds the load in the new position. Thus, one can quickly, easily and adequately secure and cover a load with the cover 10.

Still referring to FIG. 1, the strap 14 may be oriented relative to the sheet 12 as desired. For example, in this and certain other embodiments, the sheet 12 includes an anterior region 32, a posterior region 34 opposite the anterior region 32, a left side region 36, and a right side region 38 opposite the left side region 36. One of the straps 14 extends across the posterior region 34 from the left side region 36 toward the right side region 38. The other strap 14 extends across the anterior region 32 from the left side region 36 toward the right side region 38, and is parallel to the strap 14 that extends across the posterior region 34.

Other embodiments are possible. For example, the cover 10 may include one or more than two straps 14. As another example, one or both of the straps 14 may extend from the sheet's posterior region 34 toward the sheet's anterior region 32 across either the left side region 36 or the right side region 38. As another example, one or both of the straps 14 may extend diagonally across the sheet 12.

Still referring to FIG. 1, the sheet 12 may include any desired material. For example, in this and certain other embodiments, the sheet 12 includes rip-stop Nylon 6 material that is waterproof and difficult to rip before or after it has been punctured. In other embodiments the sheet 12 may include a cotton fabric that has been impregnated with rubber to waterproof it. In still other embodiments, the sheet 12 may include any desired material that can expand in either the warp (fore-aft) or the weft (side-side) direction, or both, and apply pressure to the load as a result of the expansion. With the ability to expand and apply pressure as a result of the expansion, the sheet 12 can also hold the load in place, and, if the load does move or shift, the sheet 12 can hold the load in the new position.

Still referring to FIG. 1, the cover 10 may include other components to help secure the cover 10 to the structure and to help secure the load under the cover 10. For example, in this and certain other embodiments, the cover 10 includes a strap 40 (two in this embodiment of the cover) that is not extendable, unlike the strap 14, and a tie-down 42 (two in this embodiment of the cover). To releasably attach the strap 40 and the tie-down 42 to a structure, the cover 10 may include a coupler 44 that is similar to the first and second couplers 16 and 18, respectively. To releasably fasten the strap 40 and the tie-down 42 to the sheet 12, the cover 10 may include a fastener 46 that is similar to the fastener 20. In addition, the cover 10 includes a grommet 48 (five in this embodiment of the cover) for receiving a rope, or a hook attached to a rope or cord, to help secure the cover to the structure.

Other embodiments of the cover 10 are possible. For example, the cover may include one or more than two straps 40. As another example, one or both of the straps 40 may extend across the sheet 12 from left to right like the straps 14. As another example, the straps 40 and tie-downs 42 may be releasably attached to a structure other than the sheet with a clasp, snap or any other fastener.

Still referring to FIG. 1, the cover 10 may include a component to prevent the sheet from flapping in a wind, which can quickly damage the sheet. For example, in this and certain other embodiments the cover 10 includes an anti-flap strap 50 that may be fastened to fastener 51 and through pressure and/or tension applied to anti-flap strap 50, the anti-flap strap 50 pulls taut the sheet's anterior region 32 decreasing the flapping in the wind flowing over and/or against the sheet 12. Other embodiments are possible. For example, the anti-flap strap 50 may be tied to a structure or to a portion of the load that the cover 10 covers to create the same result.

Figure 2:
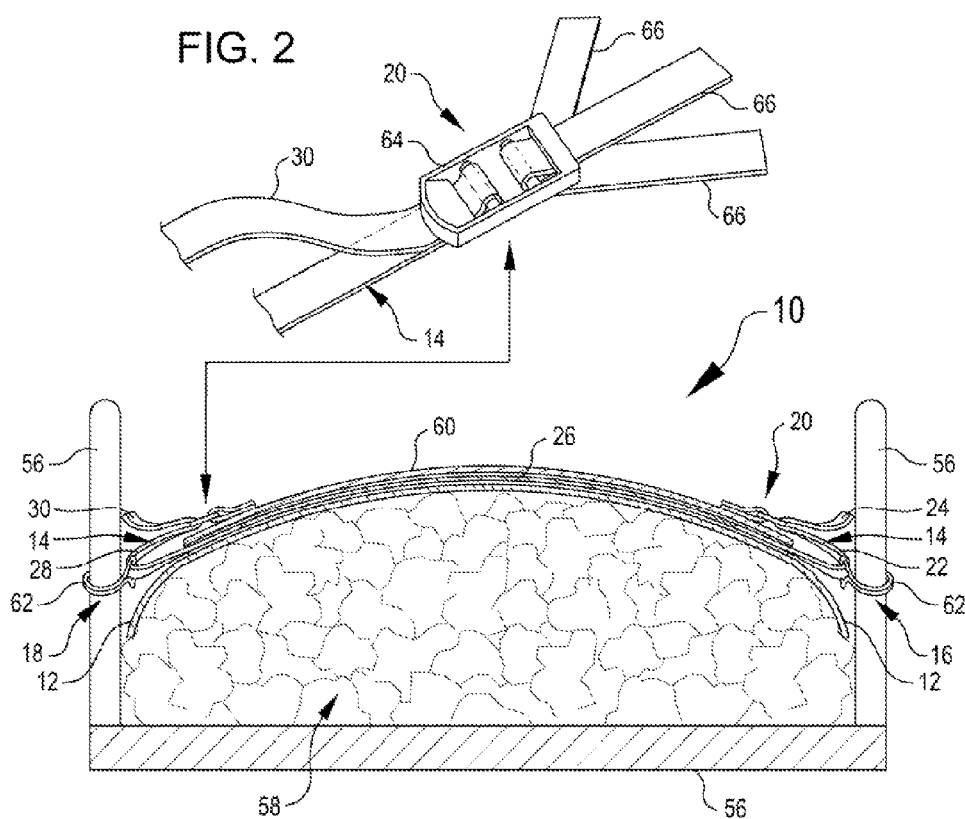
FIG. 2 is a cross-sectional view of the cover in FIG. 1, according to an embodiment of the invention.

FIG. 2 is a cross-sectional view of the cover in FIG. 1, according to an embodiment of the invention. Tension in the strap 14 may be generated by attaching the first and second couplers 16 and 18, respectively, to a structure 56 holding a load 58, then exerting pressure on the strap 14 (here pulling each end 24 and 30) until the strap 14 has extended a desired amount. To keep the tension in the strap 14 after one lets go of the ends 24 and 30, the fasteners 20 lock the strap 14 to the sheet 12 to prevent the strap 14 from moving relative to each of the couplers 16 and 18.

The strap 14 includes a first end portion 22, a middle portion 26 and a second end portion 28, each of which may include any desired material that allows the extension of the strap 14 to exert pressure on the load 58. For example in this and certain other embodiments, the middle portion 26 includes a woven Latex rubber elastic that generates tension in the strap whose amount is directly proportional to the amount that the strap extends—i.e. the difference between the length of the middle portion when its not extended and its length when it is extended. The first and second end portions 22 and 28 include woven Nylon. In other embodiments, the first end portion 22, the second end portion 28, or both may be extendable; while the middle portion 26 may not be extendable. In still other embodiments, each of the three strap portions 22, 26 and 28 may be extendable.

Other embodiments are possible. For example, the component of the strap 14 that is extendable may include a coiled torsion spring.

Still referring to FIG. 2, the cover 10 may include a component to hold the strap 14 in a position relative to the sheet 12 and thus help prevent substantial movement of strap 14 relative to the sheet 12 when tension is generated in the strap 14 and/or the load 58 moves underneath the strap 14. For example, in this and certain other embodiments, the cover 10 includes a sleeve 60 (also shown in FIG. 1). In this embodiment, two sleeves 60 hold a respective one of the straps 14, and two other sleeves 60 hold a respective one of the straps 40 (FIG. 1). Each of the sleeves 60 extends most of the length of the respective straps 14 and 40 that lie above the sheet 12, and allow the respective straps to slide within them. In this configuration, each of the sleeves 60 also protects a portion of the respective straps 14 and 40 from the environment. In other embodiments, one or more of the sleeves 60 may extend for a small portion of the length of the respective straps 14 and 40 that lie above the sheet 12, and one or more of the straps 14 and 40 may be held by more than one sleeve 60.

Still referring to FIG. 2, the first and second couplers 16 and 18 may be any desired coupler capable of releasably attaching the strap 14 to a structure (here 56), and may be attached to a respective one of the straps 14 in any desired manner. For example, in this and certain other embodiments, each of the couplers 16 and 18 includes a hook 62 (shown in greater detail in FIG. 3), that is releasably attached to a respective one of the first and second end portions 22 and 28. More specifically, the hook 62 includes a slot that is configured to hold the respective end portion 22 or 28 of the strap 14 while allowing the respective end portion 22 or 28 to slide relative to the hook. When the hook 62 is releasably attached to the structure 56, the hook 62 is disposed between the fastener 20 and the strap's middle portion 26 as one travels the length of the first end portion 22 from the first end portion's end 24 toward the strap's middle portion 26. With the hook 62 disposed between the fastener 20 and the middle portion 26, the tension, when generated in the strap 14, prevents the hook from sliding relative to the strap 14. Thus, one may loosely attach the hook 62 to the strap 14, to allow one to releasably couple the cover 10 to a variety of structures each having a different distance between their respective cover-attachment-locations. As, previously mentioned in conjunction with the discussion regarding FIG. 1, in this and certain other embodiments the couplers 44 (FIG. 1) are similar to the couplers 16 and 18.

Other embodiments are possible. For example, one or more of the couplers 16 and 18 may be fixed—i.e. not releasably attached—to the strap 14. As another example, one or more of the couplers 16 and 18 may include a loop in addition to the hook 62 or in lieu of the hook 62, or any other conventional mechanism for releasably fastening the strap 14 to a structure.

Still referring to FIG. 2, the fastener 20 may be any desired fastener capable of fastening the strap's first end portion 14 to the sheet 12. For example, in this and certain other embodiments, the fastener 20 includes a buckle 64 that is positionable along the length of the strap's first end portion 22, and locks it's position along the first end portion 22 by causing the first end portion 22 to rub against itself and thus generate friction. The buckle 64 is attached to the sheet 12 by tongues 66 that are sewn to the sheet 12 and sleeve 60. In other embodiments, the fastener may include a snap, or a buckle (similar to a belt buckle) that has a pawl that extends through a hole in the first end portion 22. The location of each hole would establish a respective one of many lockable positions along the first end portion 22. In still other embodiments, Velcro may be used to releasably attach the fastener to the sheet 12, and to lock the fastener in one or more positions along the strap's first end portion 22. As, previously mentioned in conjunction with the discussion regarding FIG. 1, in this and certain other embodiments the fasteners 46 (FIG. 1) are similar to the fasteners 20.

Other embodiments are possible. For example, the second portion 28 of the strap 14 may be sewed or otherwise fixed (not releasably attached) to the sheet 12. To attach such a cover embodiment to the structure 56 and secure the load 58 underneath the cover 10, one would fasten each of the couplers 16 and 18 to the structure 56, and then exert pressure on the first end portion 22 of the strap 14 to generate tension in the strap.

Figure 3:
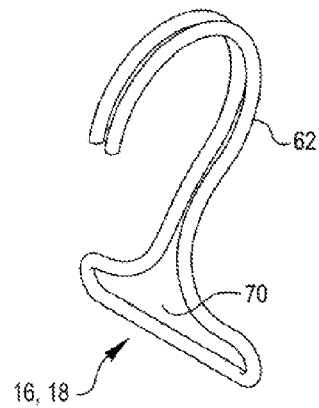
FIG. 3 is a perspective view of a coupler of the cover in FIG. 1, according to an embodiment of the invention.

FIG. 3 is a perspective view of each of the couplers 16 and 18 and 44 of the cover 10 in FIG. 1, according to an embodiment of the invention. As discussed in conjunction with FIG. 2, each of the couplers 16 and 18 may include a hook 62. In this and certain other embodiments, the hook 62 includes a slot 70 that is configured to hold the respective end portion 22 or 28 (omitted for clarity) of the strap 14 while allowing the respective end portion 22 or 28 to slide relative to the hook 62.

What is claimed is:

1. A cover for securing a load in an environment, the cover comprising:
    a sheet operable to cover a load to protect the load from the environment and to retain the load;
    a strap having a length that is extendable, and that includes a first end portion having a length, a middle portion having a length, and a second end portion having a length, the first and second end portions each having an end that is distal to the middle portion;
    a first coupler attached to the strap's first end portion and operable to releasably attach the strap's first end portion to a structure other than the sheet to anchor the cover;
    a second coupler attached to the strap's second end portion and operable to releasably attach the strap's second end portion to a structure other than the sheet to anchor the cover;
    a fastener operable to fasten the strap's first end portion to the sheet; and
    wherein, when the sheet covers a load and the first and second couplers are attached to a structure to anchor the cover, the strap's first end portion engages the fastener, and the first coupler is disposed between the strap's middle portion and the fastener as one travels along the strap from the strap's middle portion toward the end of the strap's first end portion.

2. The cover of claim 1 wherein the sheet is operable to cover a portion of a load.

3. The cover of claim 1 wherein the length of the middle portion is extendable.

4. The cover of claim 1 wherein the middle portion of the strap includes an elastic.

5. The cover of claim 1 wherein the first coupler includes a hook.

6. The cover of claim 1 wherein the first coupler is releasably attached to the strap's first end portion and is positionable along the length of the strap's first end portion.

7. The cover of claim 1 wherein:
    the first coupler is releasably attached to the strap's first end portion and is positionable along the length of the strap's first end portion, and
    the second coupler is releasably attached to the strap's second end portion and is positionable along the length of the strap's second end portion.

8. The cover of claim 1 wherein the fastener is positionable along the length of the strap's first end portion.

9. The cover of claim 1 wherein the fastener includes a buckle.

10. The cover of claim 1 wherein the sheet includes a sleeve for holding the strap to the sheet to prevent significant movement of the strap relative to the sheet.

11. The cover of claim 1 further comprising a second fastener operable to fasten the strap's second end portion to the sheet.

12. The cover of claim 1 further comprising:
    a second strap having a length that is extendable, and that includes a first end portion having a length, a middle portion having a length, and a second end portion having a length, the second strap's first and second end portions each having an end that is distal to the second strap's middle portion;
    a third coupler attached to the second strap's first end portion and operable to releasably attach the second strap's first end portion to a structure other than the sheet to anchor the cover;
    a fourth coupler attached to the second strap's second end portion and operable to releasably attach the second strap's second end portion to a structure other than the sheet to anchor the cover;
    a second fastener operable to fasten the second strap's first end portion to the sheet; and
    wherein, when the sheet covers a load and the third and fourth couplers are attached to a structure to anchor the cover, the second strap's first end portion engages the second fastener, and the third coupler is disposed between the second strap's middle portion and the second fastener as one travels along the second strap from the second strap's middle portion toward the end of the second strap's first end portion.

13. The cover of claim 1 wherein:
the sheet has an anterior region, a posterior region opposite the anterior region, a left side region, and a right side region opposite the left side region, and
the strap extends across the posterior region from the left side region toward the right side region.

14. The cover of claim 1 further comprising a component operable to prevent the sheet from flapping in a wind.

* * * * *